(12) United States Patent
Vibert et al.

(10) Patent No.: US 11,893,825 B2
(45) Date of Patent: Feb. 6, 2024

(54) METHOD FOR DETERMINING A MATCH BETWEEN A CANDIDATE FINGERPRINT AND A REFERENCE FINGERPRINT

(71) Applicant: THALES DIS FRANCE SAS, Meudon (FR)

(72) Inventors: Laurent Vibert, Les Clayes sous Bois (FR); Giang Thi Tra Dang, Singapore (SG); Qiang Li, Singapore (SG)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/641,510

(22) PCT Filed: Sep. 8, 2020

(86) PCT No.: PCT/EP2020/075110
§ 371 (c)(1),
(2) Date: Mar. 9, 2022

(87) PCT Pub. No.: WO2021/048147
PCT Pub. Date: Mar. 18, 2021

(65) Prior Publication Data
US 2022/0335750 A1 Oct. 20, 2022

(30) Foreign Application Priority Data
Sep. 10, 2019 (EP) .................................... 19306086

(51) Int. Cl.
*G06V 40/12* (2022.01)
*G06V 10/74* (2022.01)
*G06F 21/32* (2013.01)

(52) U.S. Cl.
CPC .......... *G06V 40/1371* (2022.01); *G06F 21/32* (2013.01); *G06V 10/761* (2022.01); *G06V 40/1353* (2022.01)

(58) Field of Classification Search
CPC ............. G06V 40/1371; G06V 10/761; G06V 40/1353; G06V 40/1365; G06F 21/32
See application file for complete search history.

(56) References Cited

U.S. PATENT DOCUMENTS

2004/0135147 A1 7/2004 Kim et al.
2010/0080425 A1* 4/2010 Bebis ................. G06V 40/1353
382/125

(Continued)

FOREIGN PATENT DOCUMENTS

WO WO2008140193 A1 1/2008

OTHER PUBLICATIONS

International Search Report (PCT/ISA/210) and Written Opinion (PCT/ISA/237) dated Nov. 26, 2020, by the European Patent Office as the International Searching Authority for International Application No. PCT/EP2020/075110—[17 pages].

(Continued)

*Primary Examiner* — Premal R Patel (57) ABSTRACT

Provided is a method for determining a match between a candidate fingerprint and a reference fingerprint characterized by minutiae local features. The method includes evaluating a similarity of the candidate fingerprint local feature and the reference fingerprint local feature of a current local feature pair, and determining a match depending on the similarity evaluation and geometric coherence evaluations performed for said current local feature pair. Other embodiments are disclosed.

5 Claims, 7 Drawing Sheets

(56) References Cited

U.S. PATENT DOCUMENTS

2017/0140192 A1   5/2017   Lo et al.
2017/0140193 A1*  5/2017   Wang ................. G06V 40/1324
2018/0211093 A1*  7/2018   Bae .................... G06V 40/1335

OTHER PUBLICATIONS

Cheng Feng Wang et al: "Delaunay Triangulation Algorithm for Fingerprint Matching", Voronoi Diagrams in Science and Engineering, 2006. ISVD '06. 3rd International Symposium on, IEEE, PI, Jul. 1, 2006 (Jul. 1, 2006), pp. 208-216, XP031057140, DOI: 10.1109/ISVD.2006.19 ISBN: 978-0-7695-2630-0—abstract.

Manuel Flores et al: "Fingerprint Verification Methods Using Delaunay Triangulations", The International Arab Journal of Information Technology, May 31, 2017 (May 31, 2017), XP055586332, Retrieved from the Internet: URL:https://pdfs.semanticscholar.org/4111/74aadf17b33662455b5db68782f46cd9b6cd.pdf [retrieved on May 7, 2019]—the whole document.

Kai Cao et al: "Fingerprint matching by incorporating minutiae discriminability", Biometrics (IJCB), 2011 International Joint Conference on, IEEE, Oct. 11, 2011 (Oct. 11, 2011), pp. 1-6, XP032081602, DOI: 10.1109/IJCB.2011.6117537—ISBN: 978-1-4577-1358-3 section 3.2.

Li Wei Feng et al: "Combining two strategies to optimize biometric decisions against spoofing attacks", Proceedings of SPI E/ IS & T, vol. 9216, Sep. 15, 2014 (Sep. 15, 2014), pp. 92161H-92161H, XP060039673, DOI: 10.1117/12.2061785-ISBN: 978-1-62841-730-2.

\* cited by examiner

| No. | X | Y | θ | Type |
|---|---|---|---|---|
| 0 | 262 | 46 | 331.875 | 1 |
| 1 | 136 | 52 | 0 | 2 |
| ... | ... | ... | ... | ... |
| 6 | 274 | 112 | 140.625 | 1 |
| 7 | 152 | 114 | 180 | 2 |
| 8 | 288 | 136 | 315 | 1 |
| 9 | 90 | 146 | 219.375 | 2 |
| 10 | 184 | 162 | 326.25 | 1 |
| 11 | 168 | 164 | 185.625 | 2 |
| 12 | 106 | 174 | 241.875 | 1 |
| 13 | 152 | 176 | 236.25 | 1 |
| 14 | 120 | 180 | 247.5 | 2 |
| 15 | 78 | 186 | 241.875 | 2 |
| 16 | 168 | 190 | 331.875 | 1 |
| 17 | 162 | 196 | 270 | 1 |
| 18 | 170 | 200 | 309.375 | 2 |
| 19 | 220 | 210 | 129.375 | 2 |
| 20 | 132 | 222 | 281.25 | 2 |
| 21 | 92 | 230 | 258.75 | 1 |
| 22 | 98 | 244 | 275.625 | 2 |
| 23 | 202 | 272 | 298.125 | 2 |
| 24 | 82 | 276 | 275.625 | 2 |
| 25 | 188 | 278 | 303.75 | 1 |

Fig. 6

| No. | X | Y | θ | Type |
|---|---|---|---|---|
| 0 | 278 | 114 | 320.625 | 1 |
| ... | ... | ... | ... | ... |
| 14 | 150 | 234 | 230.625 | 2 |
| 15 | 116 | 236 | 247.5 | 2 |
| 16 | 78 | 240 | 241.875 | 2 |
| 17 | 162 | 248 | 331.875 | 1 |
| 18 | 156 | 254 | 275.625 | 1 |
| 19 | 164 | 258 | 309.375 | 2 |
| 20 | 210 | 272 | 118.125 | 2 |
| 21 | 126 | 278 | 275.625 | 2 |
| 22 | 86 | 286 | 264.375 | 1 |

| No. | Minutia Index | Edge Length | Minutia Edge Angle | Minutia Type |
|---|---|---|---|---|
| 1 | [13, 16, 17] | [10, 4, 11] | [56, 39, 20] | [1, 1, 1] |
| 2 | [13, 17, 14] | [11, 22, 16] | [52, 28, 1] | [1, 1, 2] |
| 3 | [14, 20, 21] | [21, 20, 28] | [50, 34, 10] | [2, 2, 1] |
| 4 | [14, 17, 20] | [22, 19, 21] | [60, 39, 18] | [2, 1, 2] |
| 5 | [20, 25, 22] | [39, 48, 20] | [55, 28, 5] | [2, 1, 2] |
| 6 | [14, 21, 15] | [28, 23, 21] | [42, 19, 1] | [2, 1, 2] |

Fig. 9

| No. | Minutia Index | Edge Length | Minutia Edge Angle | Minutia Type |
|---|---|---|---|---|
| 1 | [14, 17, 18] | [9, 4, 10] | [55, 39, 18] | [2, 1, 1] |
| 2 | [14, 18, 15] | [10, 21, 17] | [50, 27, 0] | [2, 1, 2] |
| 3 | [15, 21, 22] | [21, 20, 29] | [50, 34, 10] | [2, 2, 1] |
| 4 | [15, 18, 21] | [21, 19, 21] | [59, 38, 18] | [2, 1, 2] |
| 5 | [15, 21, 16] | [21, 30, 19] | [50, 25, 1] | [2, 2, 2] |
| 6 | [15, 22, 16] | [29, 23, 19] | [42, 17, 1] | [2, 1, 2] |

Fig. 10

| No. | Candidate | Reference | Similarity Score, $s_t(c,r)$ |
|---|---|---|---|
| 1 | [14][17][18] | [13][16][17] | 301 |
| 2 | [14][17][18] | [13][17][14] | 20 |
| 3 | [14][18][15] | [13][17][14] | 267 |
| 4 | [15][21][22] | [14][20][21] | 342 |
| 5 | [15][18][21] | [14][17][20] | 323 |
| 6 | [15][21][16] | [20][25][22] | 20 |
| 7 | [15][22][16] | [14][21][15] | 259 |

Fig. 11

Candidate fingerprint

Reference fingerprint

Fig. 12

Candidate fingerprint

Reference fingerprint

Fig. 13

| No. | Triangle Pair | Neighbor Triangle Pair | Consistency Score, $S_g$ |
|---|---|---|---|
| 1 | $TP_{1,2}$ | $TP_{2,3}$ | 50 |
| 2 | $TP_{1,2}$ | $TP_{3,4}$ | 48 |
| 3 | $TP_{1,2}$ | $TP_{4,5}$ | 30 |
| 4 | $TP_{2,6}$ | $TP_{1,2}$ | 1 |
| 5 | $TP_{2,6}$ | $TP_{3,4}$ | 0 |
| 6 | $TP_{2,6}$ | $TP_{4,5}$ | 2 |
| 4 | $TP_{3,4}$ | $TP_{1,2}$ | 48 |
| 5 | $TP_{3,4}$ | $TP_{4,5}$ | 70 |
| 6 | $TP_{3,4}$ | $TP_{2,3}$ | 64 |

Fig. 14

| Triangle Pair | Reference Minutia Index | Candidate Minutia Index | Triangle Similarity Score $S_t$ | Global Coherence Weight W |
|---|---|---|---|---|
| $TP_{1,2}$ | [13][16][17] | [14][17][18] | 301 | 924 |
| $TP_{3,4}$ | [13][17][14] | [14][18][15] | 267 | 634 |
| $TP_{2,3}$ | [14][20][21] | [15][21][22] | 342 | 664 |
| $TP_{4,5}$ | [14][17][20] | [15][18][21] | 323 | 609 |
| $TP_{2,6}$ | [20][25][22] | [15][21][16] | 20 | -300 |
| $TP_{5,7}$ | [14][21][15] | [15][22][16] | 259 | 864 |
| ... | ... | ... | ... | ... |

METHOD FOR DETERMINING A MATCH BETWEEN A CANDIDATE FINGERPRINT AND A REFERENCE FINGERPRINT

FIELD OF THE INVENTION

The present invention relates to the field of biometric authentication processed, and more particularly to a minutiae-based fingerprint matching process to be used in such a biometric authentication process.

BACKGROUND OF THE INVENTION

Biometric authentication processes are commonly used for authenticating an individual requesting access to a secured room or to secure data.

Fingerprints are among the most used biometric features for performing such an authentication.

In order to determine if a candidate fingerprint of an individual matches a reference fingerprint, fingerprint matching processes may extract from these fingerprints local features called minutiae, and try to match minutiae of the candidate fingerprint with minutiae of the reference fingerprints.

In order to match minutiae, such a matching process may perform a Delaunay triangulation of the fingerprints defining Delaunay Triangles whose vertexes are minutiae of the fingerprint, and then may try to match Delaunay triangles computed in the candidate fingerprint with Delaunay triangles of the reference fingerprint.

An issue is that minutiae location in the fingerprint may be altered by many phenomenons: skin wrinkles or injuries may make some minutiae disappear or may make fake minutiae appear, so do lightning conditions and image noise, finger rotation induces a relative rotation of the minutiae inside the candidate fingerprint, skin elasticity changes the relative position of minutiae inside the candidate fingerprint.

This may result in Delaunay triangles of a fingerprint matching no or more than one triangle in the other fingerprint, even when the fingerprints being compared do match.

In order to improve triangles matching, existing solutions may perform a minutiae alignment process based on one reference triangle and compensating for example for fingerprint rotation. A major drawback is the cost of such an alignment process, especially when it has to be repeated.

Consequently, there is a need for a minutiae-based fingerprint matching process achieving a good matching performance despite fingerprint distortion without performing any alignment of the fingerprint minutiae.

SUMMARY OF THE INVENTION

For this purpose and according to a first aspect, this invention therefore relates to a method for determining a match between a candidate fingerprint and a reference fingerprint characterized by minutiae local features comprising:

extracting several minutiae from the candidate fingerprint, computing from said extracted minutiae a plurality of minutiae local features of the candidate fingerprint, for at least one local feature pair, called current local feature pair, among a plurality of local feature pairs comprising each a candidate fingerprint local feature and a reference fingerprint local feature:

evaluating the similarity of the candidate fingerprint local feature and the reference fingerprint local feature of the current local feature pair, for each local feature pair of the plurality of local feature pairs other than said current local feature pair, called different local feature pair, evaluating the geometric coherence of the candidate fingerprint local features of the current local feature pair and of the different local feature pair with the reference fingerprint local features of the current local feature pair and of the different local feature pair, determining a match between the candidate fingerprint local feature and the reference fingerprint local feature of the current local feature pair depending on said similarity evaluation and said geometric coherence evaluations performed for said current local feature pair, determining a match between the candidate fingerprint and the reference fingerprint based on matching local feature pairs, depending on the similarity evaluations and geometric coherence evaluations performed for said matching local feature pairs.

Such a method enables not to consider as matching local features the local features of a candidate image that look similar to local features of the reference image despite not truly matching it, by taking into account the geometric coherence of a local feature pair with the other local feature pairs obtained for the candidate image.

The minutiae local features may be a local neighborhood of minutiae.

The minutiae local features may be Delaunay minutiae triangles generated using Delaunay triangulation from extracted minutiae.

The step for evaluating the geometric coherence of the method according to the first aspect may comprise: comparing the relative distance and/or the orientation/relative rotation between the candidate fingerprint local features of the current local feature pair and of the different local feature pair with the relative distance and/or the orientation/relative rotation between the reference fingerprint local features of the current local feature pair and of the different local feature pair.

Such a comparison enables to spot the local features of the candidate image that match local features of the reference image despite fingerprint distortion.

According to an embodiment, the local features being Delaunay minutiae triangles:

evaluating the similarity of the candidate fingerprint triangle and the reference fingerprint triangle of the current triangle pair comprises: computing a similarity score based on a edge length difference and/or a minutia edge angle difference and/or a minutia type between the candidate fingerprint triangle and the reference fingerprint triangle of the current triangle pair, evaluating the geometric coherence of the candidate fingerprint triangles of the current triangle pair and of the different triangle pair with the reference fingerprint triangles of the current triangle pair and of the different triangle pair comprises: computing a geometric consistency score based on the variation, between the candidate fingerprint and the reference fingerprint, of the distance between the mass centers of the triangles of the current and of the different triangle pairs and/or based on the variation, between the candidate fingerprint and the reference fingerprint, of the relative orientation between the triangles of the current and of the different triangle pairs, determining a match between the candidate fingerprint triangle and the reference fingerprint triangle of the current triangle pair comprises: computing a global coherence weight for the current triangle pair based on said similarity score and said geometric consistency scores computed for said current triangle pair and comparing said computed global coherence weight with a predetermined threshold, determining a match between the candidate fingerprint and the reference fingerprint comprises: computing a final fingerprint matching score based on the similarity scores and global coherence weights of the triangle pairs whose computed global coherence weight is above said predetermined threshold.

Such a method enables to determine the local feature pairs that truly match despite distortions of the fingerprint, and to determine if the candidate fingerprint matches the reference fingerprint based on matching local features and their scores and weights.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a client device configured for determining a match between a candidate fingerprint and a reference fingerprint characterized by minutiae local features and comprising a processor, a memory and an input-output interface configured for performing the steps of the method according to the first aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

The invention aims at improving a matching process trying to determine a matching between a candidate fingerprint and a reference fingerprint, both characterized by a set of minutiae and by local features of these minutiae.

In an embodiment, minutiae local features are a local neighborhood of the minutiae. For example such a local feature may be information about the fingerprint texture around a minutia, or information about the neighboring minutiae.

In an embodiment, the minutiae local features are Delaunay minutiae triangles generated using Delaunay triangulation from minutiae extracted from the fingerprints. In the rest of the description, it will be assumed that the minutiae local features are Delaunay minutiae triangles, as an example.

For that purpose, the main idea of the method according to the invention is to take advantage of the fact that the positioning of a local feature of a fingerprint relative to another local feature of the same fingerprint is almost unaffected by fingerprint geometric transformations such as rotation or wrinkling. As a result, when a local feature of a candidate fingerprint is matched to a local feature of a reference fingerprint, erroneous matching may be detected by comparing the positioning of the matched local feature of the candidate fingerprint relative to other local features of the candidate fingerprint with the positioning of the matched local feature of the reference fingerprint relative to other local features of the reference fingerprint. Said differently, when the match is genuine, the relative position of the matched local feature relative to the other local features of the fingerprint is almost the same in the candidate and the reference fingerprint.

Figure 1:
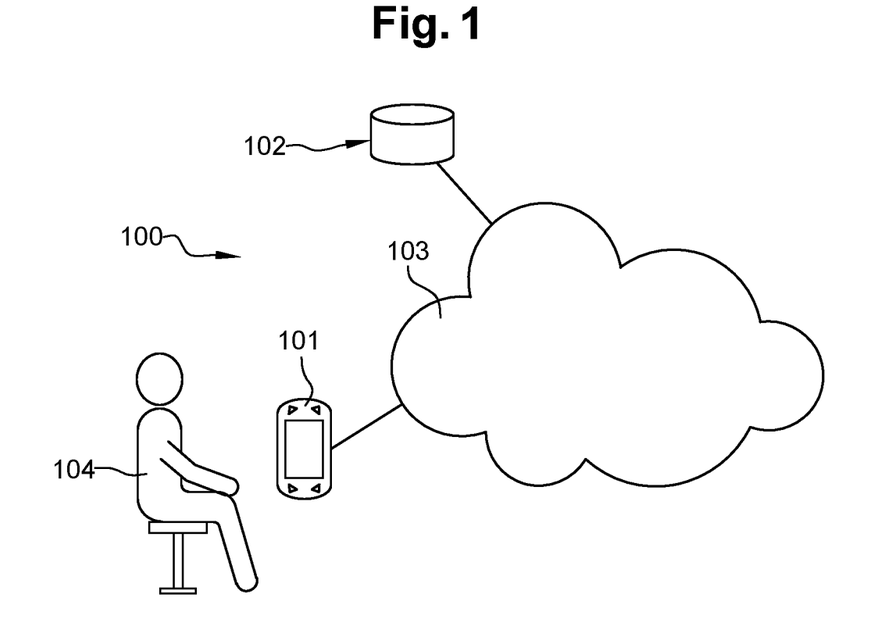
FIG. 1 is a schematic illustration of a system according to an embodiment of the present invention.

As illustrated on FIG. 1, the method according to the invention is performed by a biometric authentication system 100 comprising a fingerprint matching device 101 called matching device. This matching device may either be an unmovable device, such as a server computer, or a portable device such as a smartcard, a mobile phone or a tablet.

The matching device is connected to a storage unit 102 for storing reference fingerprints. This storage unit may be integrated in the matching device. Alternatively, as shown on FIG. 1, it may be external to it and connected to it either locally, for example through a USB interface, or remotely across a network 103. The matching device 101 is configured to determine if the fingerprint of a user 104, undergoing a biometric authentication process by the biometric authentication system 100, matches any of the reference fingerprints stored in the storage unit.

Figure 2:
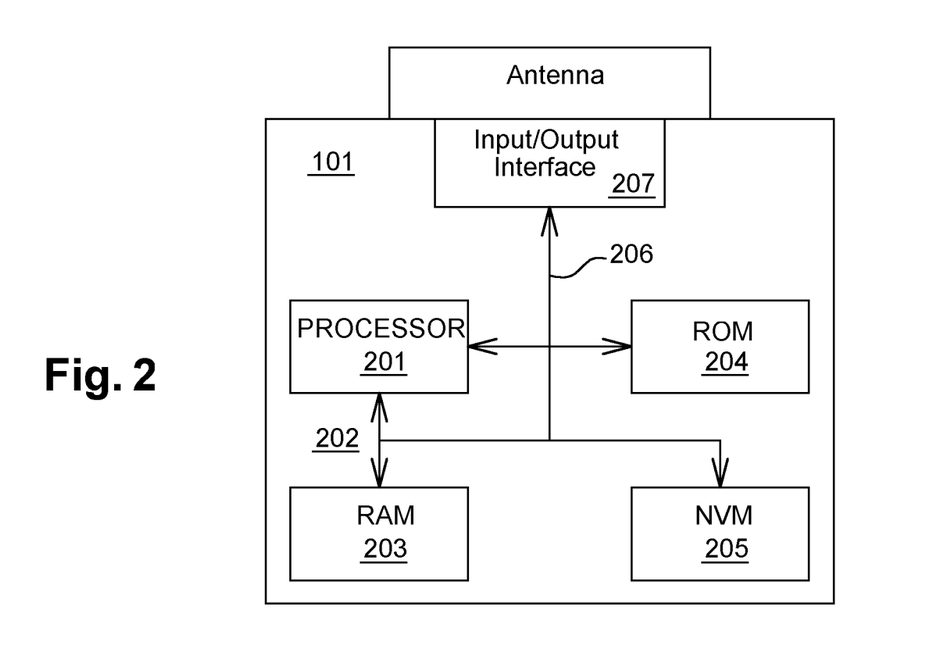
FIG. 2 is a schematic illustration of a client device according to an embodiment of the present invention.

FIG. 2 is a schematic illustration of a matching device 101. The matching device 101 may include a processor 201 connected via a bus 202 to a random access memory (RAM) 203, a read-only memory (ROM) 204, and/or a non-volatile memory (NVM) 205. The matching device 101 further includes a connector 206 connected to the processor and by which the client device 101 may be connected to an antenna. Such an antenna may be used to connect the matching device 101 to various forms of wireless networks, e.g., wide-area networks, WiFi networks, or mobile telephony networks, including the network 103. Alternatively, the matching device 101 may connect to networks, including the network 103, via wired network connections such as Ethernet.

The matching device may also include input/output means 207 providing interfaces to an administrator of the matching device, such as one or more screens, loudspeakers, a mouse, tactile surfaces, a keyboard etc. . . . . .

Figure 3:
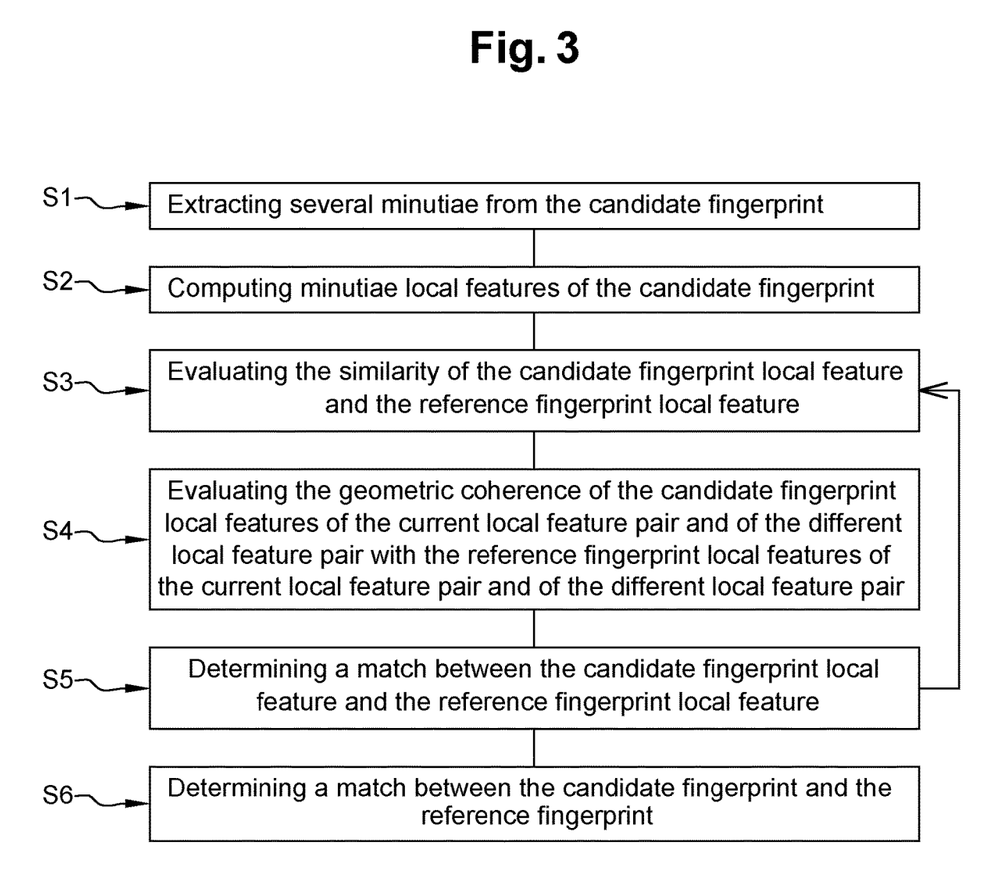
FIG. 3 illustrates schematically a method for determining a match between a candidate fingerprint and a reference fingerprint according to an embodiment of the present invention.

The following paragraphs describe the steps of a method for determining a match between a candidate fingerprint and a reference fingerprint characterized by minutiae local features, performed by the matching device 101 according to a first aspect of the invention as depicted on FIG. 3.

In a first step S1, the matching device extracts several minutiae from the candidate fingerprint. Each minutia may be defined by its coordinates in the fingerprint it is extracted from, by its orientation, and by a type indicating for example whether the minutiae is a ridge ending or a bifurcation.

Figure 4:
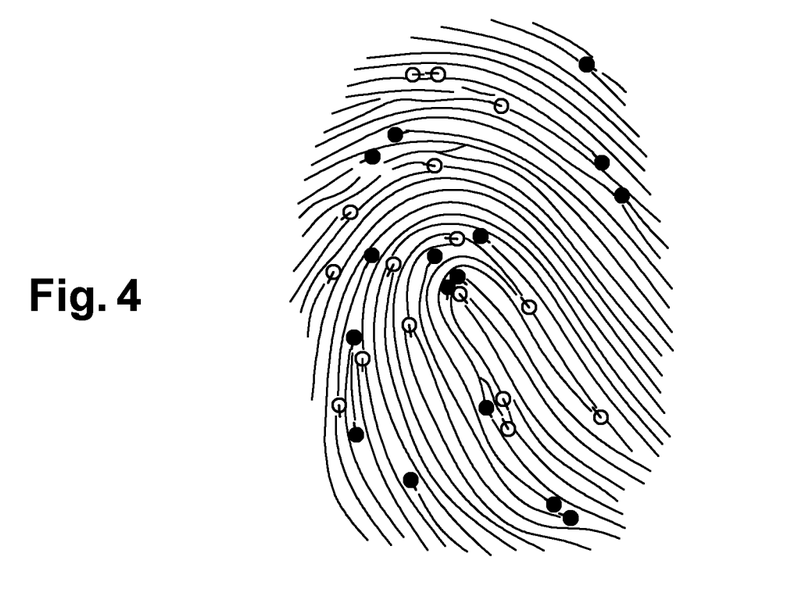
FIGS. 4 and 5 illustrate schematically minutiae extracted from a fingerprint and the result of applying a Delaunay triangulation to these minutiae.
Figure 5:
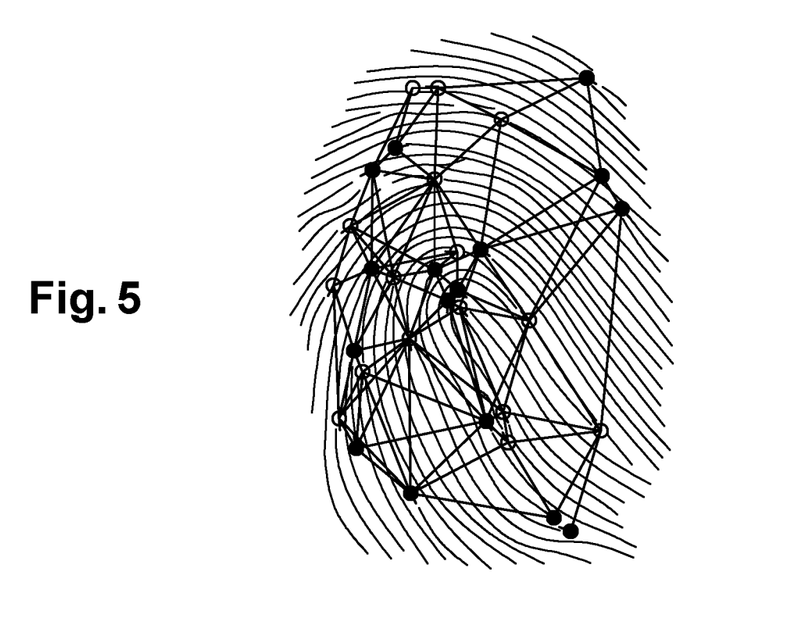

In a second step S2, the matching device computes from said extracted minutiae a plurality of minutiae local features of the candidate fingerprint. As described here above, the minutiae local features may be Delaunay minutiae triangles generated using Delaunay triangulation from the extracted minutiae. FIG. 4 gives an example of a fingerprint and shows the minutiae extracted from this fingerprint. FIG. 5 shows the result of applying a Delaunay triangulation to the minutiae shown on FIG. 4. Each Delaunay triangle is defined by the minutiae used as vertexes of it. It may also be characterized by features such as:
- the length of its edges,
- the angle between each minutiae orientation and the first edge of the triangle encountered when rotating clockwise from the minutiae orientation, called hereafter "minutia edge angle",
- the type of each of its minutiae.

Figure 6:
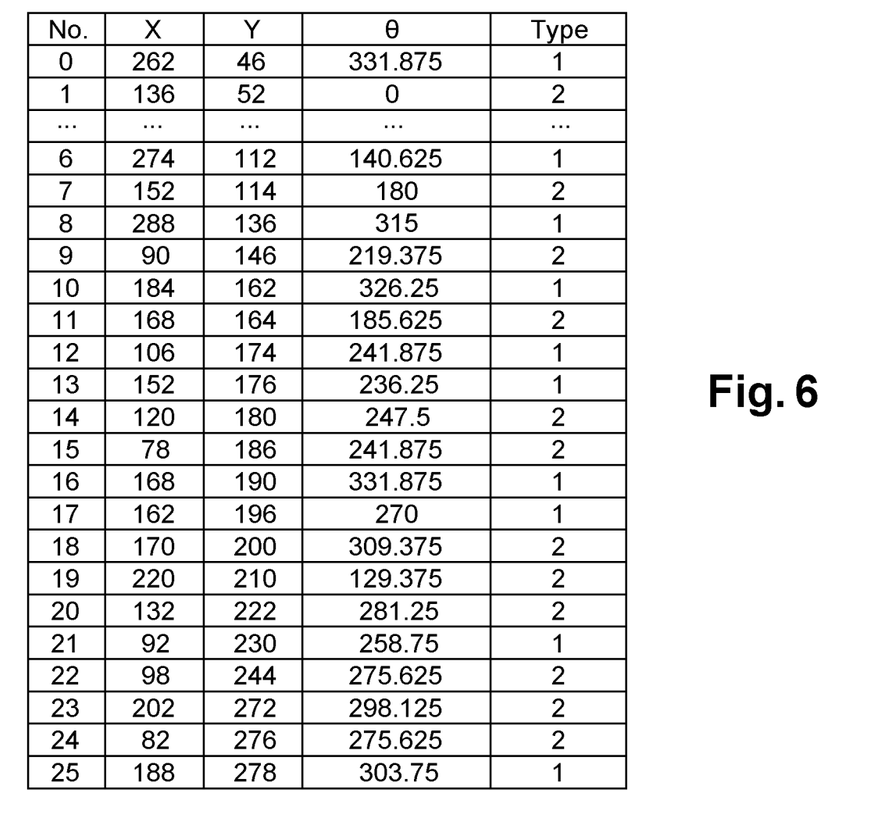
FIGS. 6 and 7 illustrate examples of respectively reference minutiae extracted from a reference fingerprint and candidate minutiae extracted from a candidate fingerprint.
Figure 7:
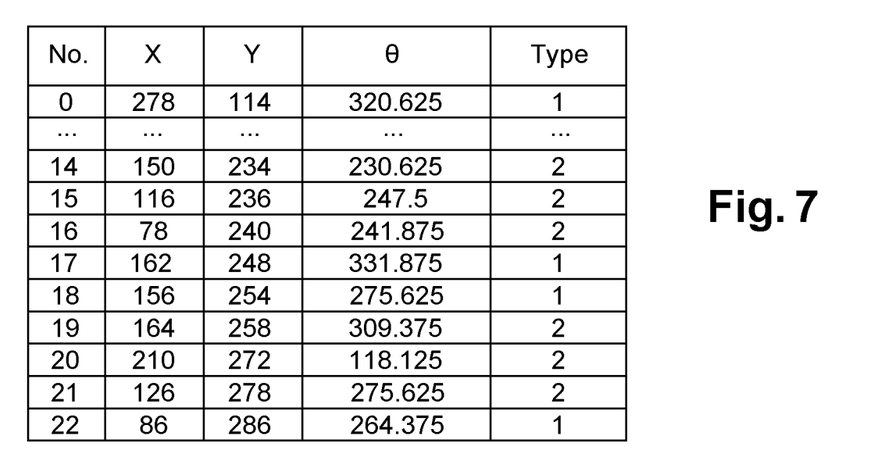
Figure 8:
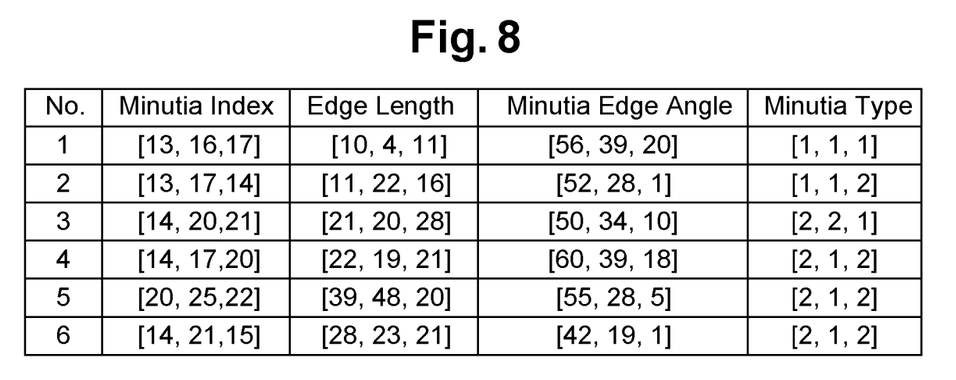
FIGS. 8 and 9 illustrate examples of the Delaunay triangles obtained by Delaunay triangulation respectively from the reference minutiae of FIG. 6 and from the candidate minutiae of FIG. 7.
Figure 9:
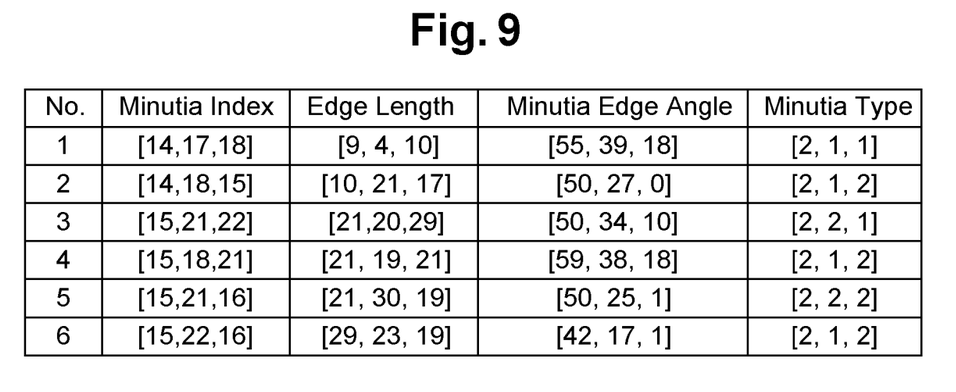

FIG. 6 and FIG. 7 provide examples of respectively reference minutiae extracted from a reference fingerprint and candidate minutiae extracted from a candidate fingerprint. In the same example, FIG. 8 and FIG. 9 provide examples of the Delaunay triangles obtained by Delaunay triangulation respectively from the reference minutiae of FIG. 6 and from the candidate minutiae of FIG. 7.

In the following paragraphs, minutiae local features are called "local features"; and a set gathering a local feature of a candidate fingerprint and a local feature of a reference fingerprint is called a "local feature pair".

The following steps describe the process applied to at least one local feature pair, called current local feature pair, among the plurality of local feature pairs gathering a local feature of the candidate fingerprint and a local feature of the reference fingerprint. Such steps are preferably applied to most of or all of these local feature pairs.

In a third step S3, the matching device evaluates the similarity of the candidate fingerprint local feature and the reference fingerprint local feature of the current local feature pair.

When local features are Delaunay minutiae triangles, evaluating the similarity of the candidate fingerprint triangle and the reference fingerprint triangle of the current triangle pair may comprise computing a similarity score based on a edge length difference and/or a minutia edge angle difference and/or a minutia type between the candidate fingerprint triangle and the reference fingerprint triangle of the current triangle pair.

Such a step may be repeated for all local feature pairs, i.e. such that a similarity score is computed for each triangle of the candidate fingerprint with all the triangles of the reference fingerprint.

Given two triangles c and r, the similarity score $S_t(c,r)$ may be defined as:

$$S_t(c, r) = \begin{cases} 0 \text{ if } C_d(c, r) \geq C_d^{max} \text{ or } C_\alpha(c, r) \geq C_\alpha^{max} \\ S_t^{max} - C_d(c, r) - C_\alpha(c, r) - C_m(c, r) \end{cases}$$

$$\text{and } s_t(c, r) = \begin{cases} 0 \text{ if } S_t(c, r) < 0 \\ S_t(c, r) \text{ otherwise} \end{cases}$$

where $S_t^{max}$ is a predefined maximum similarity score; $C_d$, $C_\alpha$ and $C_m$ are feature costs due to feature dissimilarity of two triangles, $C_d^{max}$ and $C_\alpha^{max}$ are predefined cost thresholds.

The function $C_d(c,r)$ computes the edge length difference costs of the triangles, either as absolute values or as a percentage of the total edge length of the reference or candidate triangles, and may be defined as $$C_d(c, r) = \begin{cases} 0 \text{ if } \exists\, i\, (|d_i^c - d_i^r| > THD_l) \text{ or } C_d^{max} \leq sum_{i=1,2,3}\{|d_i^c - d_i^r| \times C_d^u\} \\ C_d^{max} - sum_{i=1,2,3}\{|d_i^c - d_i^r| \times C_d^u\} \text{ otherwise} \end{cases}$$

where $d_i^c$ and $d_i^r$ are edge length of candidate and reference triangles respectively; $THD_l$ is a predefined maximum allowable edge length difference; $C_d^u$ is a unit cost of edge length difference.

The function $C_\alpha(c,r)$ computes the minutia edge angle difference costs of the triangles:

$$C_\alpha(c, r) = \begin{cases} 0 \text{ if } \exists\, i\, (|\alpha_i^c - \alpha_i^r| > THD_\alpha) \text{ or } C_\alpha^{max} \leq sum_{i=1,2,3}\{|\alpha_i^c - \alpha_i^r| \times C_\alpha^u\} \\ C_\alpha^{max} - sum_{i=1,2,3}\{|\alpha_i^c - \alpha_i^r| \times C_\alpha^u\} \text{ otherwise} \end{cases}$$

where $\alpha_i^c$ and $\alpha_i^r$ may for example be the mean of minutia edge angles at triangle's vertices of candidate and reference triangles respectively; $THD_\alpha$ is the maximum allowable edge length difference; $C_\alpha^u$ is the unit cost of minutia edge angle difference.

$C_m(c,r)$ computes a minutiae type difference cost defined as:

$$C_m(c,r) = sum_{i=1,2,3}\{I(m_i^c, m_i^r) \times C_m^u\}$$

where $I(m_i^c, m_i^r)$ is the identity function, $C_m$ is the unit cost of minutiae type mismatch.

Figure 10:
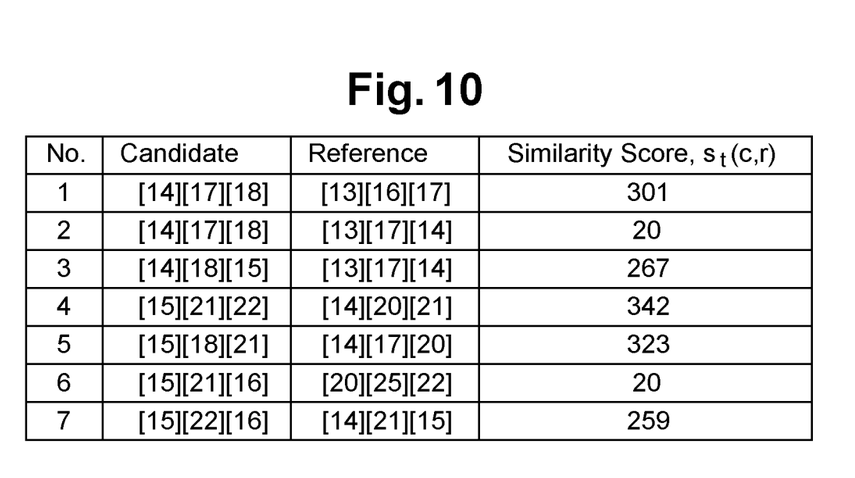
FIG. 10 illustrates examples of similarity scores computed from the Delaunay triangles of FIGS. 8 and 9.

Examples of similarity scores computed from the Delaunay triangles of FIGS. 8 and 9 are provided in FIG. 10.

Using such formulas, when two triangles of a triangle pair are similar, their similarity score is high. On the other hand, when they are not similar, their similarity score is low or zero.

At the end of this step, a triangle of the candidate fingerprint may have a high similarity score with several triangles of the reference fingerprint. On the other hand, some triangle of the candidate fingerprint may have only null similarity scores with all the triangles of the reference fingerprint.

In a fourth step S4, the geometric coherence of the current local feature pair with the other local feature pairs is checked. In order to do so, the matching device repeatedly selects the current local feature pair and another local feature pair and checks if the relative position of the two local features is the same in the candidate fingerprint and in the reference fingerprint. More precisely, the matching device evaluates for each local feature pair other than the current local feature pair, called different local feature pair, the geometric coherence of the candidate fingerprint local features of the current local feature pair and of the different local feature pair with the reference fingerprint local features of the current local feature pair and of the different local feature pair.

Such a geometric coherence evaluation of two local features in the candidate finger print versus two local features in the reference fingerprint may include comparing the relative distance or relative orientation of the two local features in the candidate fingerprint with the relative distance or relative orientation of the two local features in the reference fingerprint. More precisely, it may comprise comparing the relative distance and/or the orientation/relative rotation between the candidate fingerprint local features of the current local feature pair and of the different local feature pair with the relative distance and/or the orientation/relative rotation between the reference fingerprint local features of the current local feature pair and of the different local feature pair.

When the local features are Delaunay triangles, such a geometric coherence evaluation may include computing a geometric consistency score based on the variation, between the candidate fingerprint and the reference fingerprint, of the distance between the mass centers of the triangles of the current and of the different triangle pairs and/or based on the variation, between the candidate fingerprint and the reference fingerprint, of the relative orientation between the triangles of the current and of the different triangle pairs.

For example, if we consider a first triangle pair $TP_{i,u}$ composed of a triangle i in the candidate fingerprint and a triangle u in the reference fingerprint, and a second triangle pair $TP_{j,v}$ composed of a triangle j in the candidate fingerprint and a triangle v in the reference fingerprint, a geometric consistency score $S_g(TP_{i,u},TP_{j,v})$ for these two triangle pairs may be defined as:

$$S_g(TP_{i,u},TP_{j,v})=S_{dp}(TP_{i,u},TP_{j,v})+S_{op}(TP_{i,u},TP_{j,v})$$

and $S_g = \max(S_g^{min}, S_g)$ where $S_g^{min}$ is a minimum value of the geometric consistency score.

In this formula, $S_{dp}(TP_{i,u},TP_{j,v})$ is a distance consistency score which may be defined as:

$$S_{dp}(TP_{i,u},TP_{j,v})=S_{dp}^{max}-DP^d(TP_{i,u},TP_{j,c}) \times C_{dp}^u$$

and $S_{dp} = \max(S_{dp}^{min}, S_{dp})$ where $S_{dp}^{max}$ and $S_{dp}^{min}$ are predefined maximum and minimum $S_{dp}$ scores respectively; $C_{dp}^u$ is the unit cost of distance difference; and $DP^d(TP_{i,u},TP_{j,v})$ is a distance difference of the two triangle pairs, which may be defined as:

$$DP^d(TP_{i,u},TP_{j,v})=abs(d_{ij}^c-d_{uv}^r)$$

with $d_{ij}^c$ the distance between the mass centers of the triangles i and j in the candidate fingerprint and $d_{uv}^r$ the distance between the mass centers of the triangles u and v in the reference fingerprint.

When the triangles of the current local feature pair truly match and the triangles of the different local feature pair also truly match, the distance between the two local features should be almost the same in the candidate fingerprint and in the reference fingerprint; therefore the distance difference of the two triangle pairs $DP^d$ should be small.

Figure 11:
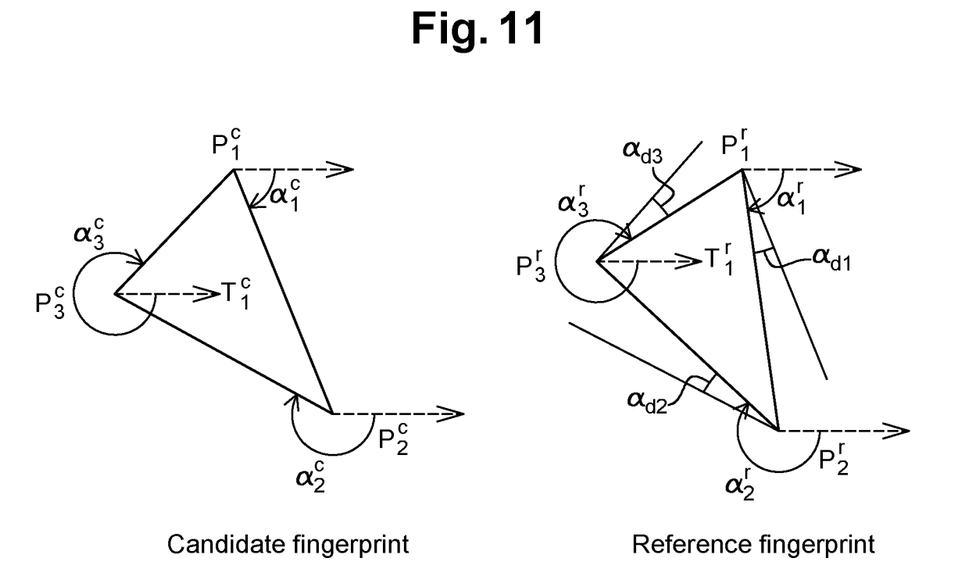
FIG. 11 illustrates computations of orientation consistency scores.

In the geometric consistency score $DP^d(TP_{i,u}, TP_{j,v})$ formula given above, $S_{op}(TP_{i,u},TP_{j,v})$ is an orientation consistency score which may be defined as:

$$S_{op}(TP_{i,u},TP_{j,v})=S_{op}^{max}-OP^d(TP_{i,u},TP_{j,c}) \times C_{op}^u$$

and $S_{op} = \max(S_{op}^{min}, S_{op})$ where $S_{op}^{max}$ and $S_{op}^{min}$ are predefined maximum and minimum $S_{dp}$ scores respectively; Coup is the unit cost of distance difference and $OP^d(TP_{i,u},TP_{j,v})$ is an orientation difference of the two triangle pairs, which may be defined as:

$$OP^d(TP_{i,u},TP_{j,v})=abs(O^d(T_i^c,T_u^r)-O^d(T_j^c,T_v^r))$$

where $O^d(T_1^c,T_1^r)$ represents an orientation difference between two triangles and may be defined as the average, among all sides of the triangles, of the difference of orientation of a given triangle side between the two triangles $O^d(T_1^c,T_1^r)=\text{avg}(\alpha_{d1}, \alpha_{d2}, \alpha_{d3})$, with $\alpha_{di}=\alpha_i^r-\alpha_i^c$ and $\alpha_i^r$, respectively $\alpha_i^c$, the orientation of side i in the reference triangle, respectively candidate triangle, relative to a reference direction, as shown on FIG. 11.

When the triangles of the current local feature pair truly match and the triangles of the different local feature pair also truly match, even if a rotation has been applied to the candidate fingerprint, the orientation difference between the two triangles (one in the candidate fingerprint and one in the reference fingerprint) of the current local feature pair will be the same as the one between the two triangles of the different local feature pair and the orientation difference $OP^d(TP_{i,u}, TP_{j,v})$ should be small.

Figure 12:
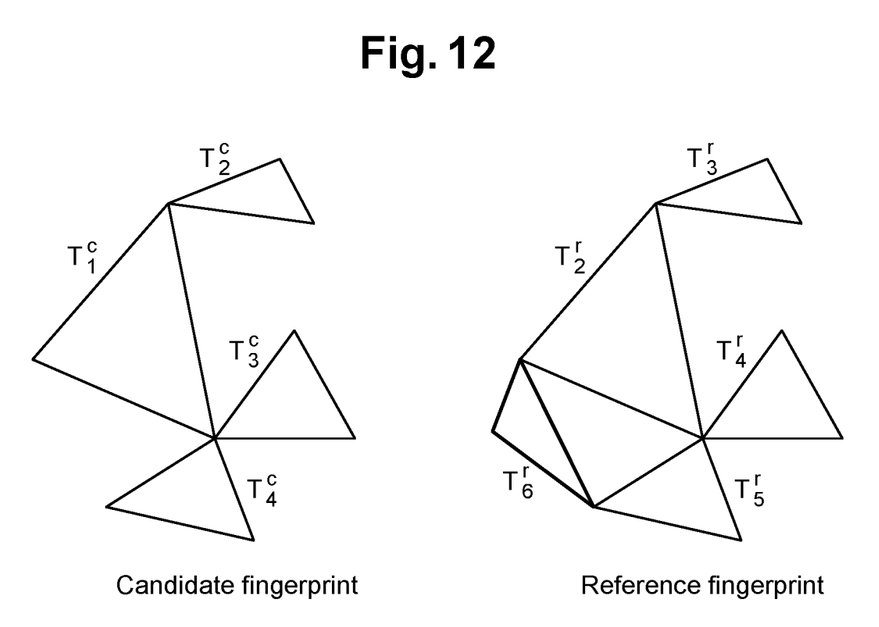
FIG. 12 and FIG. 13 illustrate an example of minutiae Delaunay triangles in a candidate fingerprint and in a reference fingerprint and the geometric consistency score computed by the matching device for these triangles.
Figure 13:
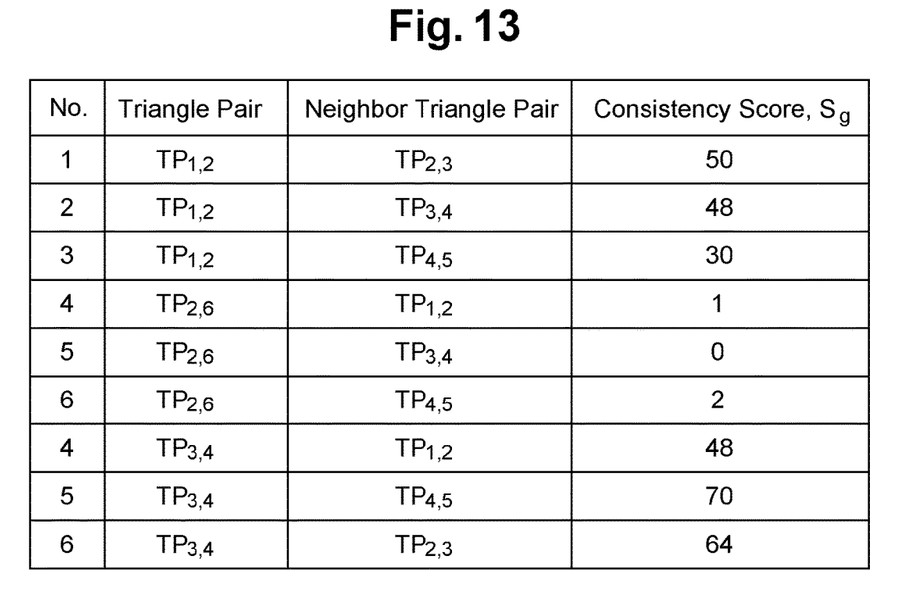

FIG. 12 shows an example of minutiae Delaunay triangles in a candidate fingerprint and in a reference fingerprint. Triangle 2 in the candidate fingerprint has the same shape than triangles 3 and 6 in the reference fingerprint but it should only match triangle 3. FIG. 13 gives for these triangles the geometric consistency score $S_g(TP_{i,u},TP_{j,v})$ computed by the matching device. Since triangle 2 in the candidate fingerprint and triangle 6 in the reference fingerprint do not match, the scores computed for the triangle pair $TP_{2,6}$ and any other triangle pair are much lower than the scores computed for two truly matching triangle pairs.

This step may be repeated for all the local feature pairs in order to evaluate the geometric coherence of each local feature pair with all other local feature pairs.

In a fifth step S5 the matching device determines if the two local features of the current local feature pair truly match based on the evaluations performed in the previous steps.

More precisely, the matching device determines a match between the candidate fingerprint local feature and the reference fingerprint local feature of the current local feature pair depending on the similarity evaluation and the geometric coherence evaluations performed for the current local feature pair.

When the local features are Delaunay triangles, such a determination may comprise computing a global coherence weight for the current triangle pair based on the similarity score and the geometric consistency scores computed for the current triangle pair and comparing the computed global coherence weight with a predetermined threshold.

In a first embodiment, the global coherence weight may be the sum of all the geometric consistency scores computed for the current triangle pair.

In a second embodiment, the global coherence weight of the current triangle pair $TP_i$ may be a weighted sum of the geometric consistency scores computed for the current triangle pair: $\Sigma(S_g(TPi, TPj)*St(TPj))$, using as weight of the geometric score obtained for the set (TPi, TPj) the similarity score of TPj. Such a weighted sum may be computed iteratively.

Figure 14:
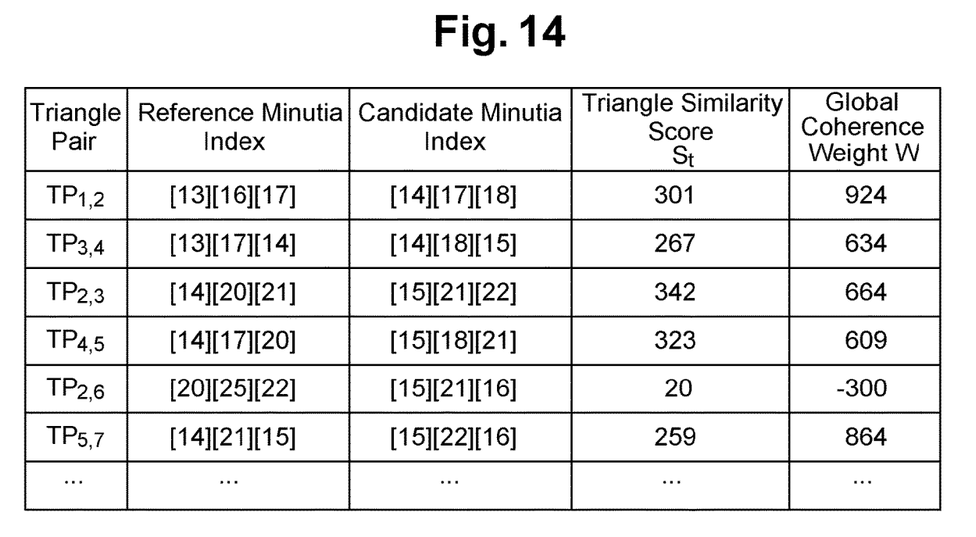
FIG. 14 illustrates an example of the global coherence weights computed for the Delaunay triangles of FIGS. 8 and 9.

FIG. 14 gives an example of the global coherence weights computed for the Delaunay triangles of FIGS. 8 and 9. In this example, triangle pairs that truly match have both a high similarity score and a high global coherence weight, whereas triangle pairs of triangles that do not match such as $TP_{2,6}$ have a low global coherence weight.

This step may be repeated in order to determine a global coherence weight for each local feature pair and to determine if the two local features of each pair truly match.

In a sixth step S6, the matching device determines if the candidate fingerprint matches the reference fingerprint based on the results of the previous steps.

More precisely, the matching device determines a match between the candidate fingerprint and the reference fingerprint based on matching local feature pairs, depending on the similarity evaluations and geometric coherence evaluations performed for said matching local feature pairs.

Such a determination may comprise computing a final fingerprint matching score based on the similarity scores and global coherence weights of the triangle pairs whose computed global coherence weight is above said predetermined threshold.

For example, such a final fingerprint matching score may be defined as $$S_f = \frac{\left[\sum_{k \in \{W_i \geq THD_w\}}^{M} (S_i \times W_i)\right]}{M}$$

where $W_i$ is the global coherence weight of local feature pair i, $S_i$ is the similarity score of local feature pair i and M is the total number of triangle pairs. Such a score increases as the number of matching pairs and their similarity score and global coherence weight increases.

According to a second aspect, the invention is also related to a computer program product directly loadable into the memory of at least one computer, comprising software code instructions for performing the steps of the method according to the first aspect as described above when said product is run on the computer.

According to a third aspect, the invention is also related to client device 101 configured for determining a match between a candidate fingerprint and a reference fingerprint characterized by minutiae local features and comprising a processor 201, a memory 203, 204, 205 and an input-output interface 207 configured for performing the steps of the method according to the first aspect as described here above.

As a result, the matching process described above enables to match minutiae despite fingerprint distortion, without performing any alignment of the fingerprint minutiae.

The invention claimed is:

1. A method for determining a match between a candidate fingerprint and a reference fingerprint characterized by minutiae local features comprising:
   extracting several minutiae from the candidate fingerprint,
   computing from said extracted minutiae a plurality of minutiae local features of the candidate fingerprint,
   for at least one local feature pair, called current local feature pair, among a plurality of local feature pairs comprising each a candidate fingerprint local feature and a reference fingerprint local feature:
      evaluating the similarity of the candidate fingerprint local feature and the reference fingerprint local feature of the current local feature pair,
      for each local feature pair of the plurality of local feature pairs other than said current local feature pair, called different local feature pair, evaluating the geometric coherence of the candidate fingerprint local features of the current local feature pair and of the different local feature pair with the reference fingerprint local features of the current local feature pair and of the different local feature pair,
      determining a match between the candidate fingerprint local feature and the reference fingerprint local feature of the current local feature pair depending on said similarity evaluation and said geometric coherence evaluations performed for said current local feature pair,
   determining a match between the candidate fingerprint and the reference fingerprint based on matching local feature pairs, depending on the similarity evaluations and geometric coherence evaluations performed for said matching local feature pairs,
   wherein the minutiae local features are Delaunay minutiae triangles generated using Delaunay triangulation from extracted minutiae, and
   wherein evaluating the geometric coherence comprises: comparing the relative distance and/or the orientation/relative rotation between the candidate fingerprint local features of the current local feature pair and of the different local feature pair with the relative distance and/or the orientation/relative rotation between the reference fingerprint local features of the current local feature pair and of the different local feature pair.

2. The method of claim 1, wherein the minutiae local features are a local neighborhood of minutiae.

3. The method of claim 1, wherein the local features being Delaunay minutiae triangles:
   evaluating the similarity of the candidate fingerprint triangle and the reference fingerprint triangle of the current triangle pair comprises: computing a similarity score based on a edge length difference and/or a minutia edge angle difference and/or a minutia type between the candidate fingerprint triangle and the reference fingerprint triangle of the current triangle pair,
   evaluating the geometric coherence of the candidate fingerprint triangles of the current triangle pair and of the different triangle pair with the reference fingerprint triangles of the current triangle pair and of the different triangle pair comprises: computing a geometric consistency score based on the variation, between the candidate fingerprint and the reference fingerprint, of the distance between the mass centers of the triangles of the current and of the different triangle pairs and/or based on the variation, between the candidate fingerprint and the reference fingerprint, of the relative orientation between the triangles of the current and of the different triangle pairs,
   determining a match between the candidate fingerprint triangle and the reference fingerprint triangle of the current triangle pair comprises: computing a global coherence weight for the current triangle pair based on said similarity score and said geometric consistency scores computed for said current triangle pair and comparing said computed global coherence weight with a predetermined threshold,
   determining a match between the candidate fingerprint and the reference fingerprint comprises: computing a final fingerprint matching score based on the similarity scores and global coherence weights of the triangle pairs whose computed global coherence weight is above said predetermined threshold.

4. A computer program product directly loadable into a non-transitory memory of at least one computer, comprising software code instructions for performing the following steps when said product is run on the at least one computer
   extracting several minutiae from a candidate fingerprint, computing from said extracted minutiae a plurality of minutiae local features of the candidate fingerprint, for at least one local feature pair, called current local feature pair, among a plurality of local feature pairs comprising each a candidate fingerprint local feature and a reference fingerprint local feature:

evaluating the similarity of the candidate fingerprint local feature and the reference fingerprint local feature of the current local feature pair, for each local feature pair of the plurality of local feature pairs other than said current local feature pair, called different local feature pair, evaluating the geometric coherence of the candidate fingerprint local features of the current local feature pair and of the different local feature pair with the reference fingerprint local features of the current local feature pair and of the different local feature pair, determining a match between the candidate fingerprint local feature and the reference fingerprint local feature of the current local feature pair depending on said similarity evaluation and said geometric coherence evaluations performed for said current local feature pair, and determining a match between the candidate fingerprint and a reference fingerprint based on matching local feature pairs, depending on the similarity evaluations and geometric coherence evaluations performed for said matching local feature pairs, wherein the minutiae local features are Delaunay minutiae triangles generated using Delaunay triangulation from extracted minutiae, and wherein evaluating the geometric coherence comprises: comparing the relative distance and/or the orientation/relative rotation between the candidate fingerprint local features of the current local feature pair and of the different local feature pair with the relative distance and/or the orientation/relative rotation between the reference fingerprint local features of the current local feature pair and of the different local feature pair.

5. A client device configured for determining a match between a candidate fingerprint and a reference fingerprint characterized by minutiae local features, the device comprising a processor, a non-transitory memory coupled thereto and an input-output interface coupled thereto configured for:

extracting several minutiae from the candidate fingerprint, computing from said extracted minutiae a plurality of minutiae local features of the candidate fingerprint, for at least one local feature pair, called current local feature pair, among a plurality of local feature pairs comprising each a candidate fingerprint local feature and a reference fingerprint local feature:

evaluating the similarity of the candidate fingerprint local feature and the reference fingerprint local feature of the current local feature pair, for each local feature pair of the plurality of local feature pairs other than said current local feature pair, called different local feature pair, evaluating the geometric coherence of the candidate fingerprint local features of the current local feature pair and of the different local feature pair with the reference fingerprint local features of the current local feature pair and of the different local feature pair, determining a match between the candidate fingerprint local feature and the reference fingerprint local feature of the current local feature pair depending on said similarity evaluation and said geometric coherence evaluations performed for said current local feature pair, and determining a match between the candidate fingerprint and the reference fingerprint based on matching local feature pairs, depending on the similarity evaluations and geometric coherence evaluations performed for said matching local feature pairs, wherein the minutiae local features are Delaunay minutiae triangles generated using Delaunay triangulation from extracted minutiae, and wherein evaluating the geometric coherence comprises: comparing the relative distance and/or the orientation/relative rotation between the candidate fingerprint local features of the current local feature pair and of the different local feature pair with the relative distance and/or the orientation/relative rotation between the reference fingerprint local features of the current local feature pair and of the different local feature pair.

\* \* \* \* \*